(No Model.)
M. R. STRUNK.
VEHICLE SPRING.
No. 390,625. Patented Oct. 2, 1888.
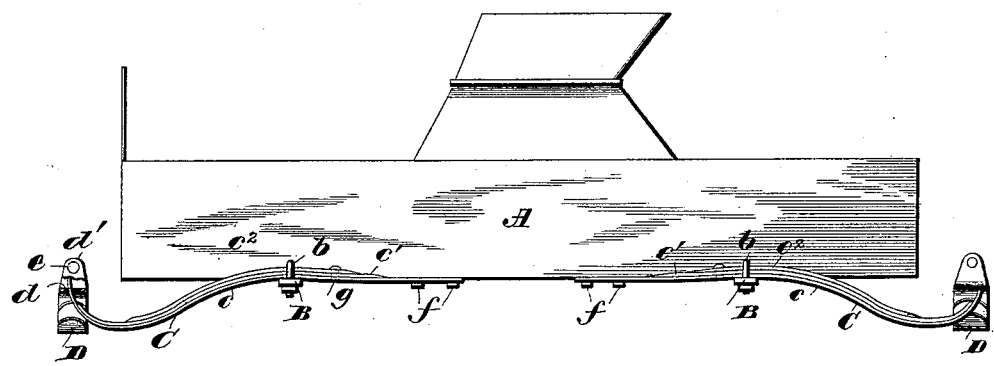
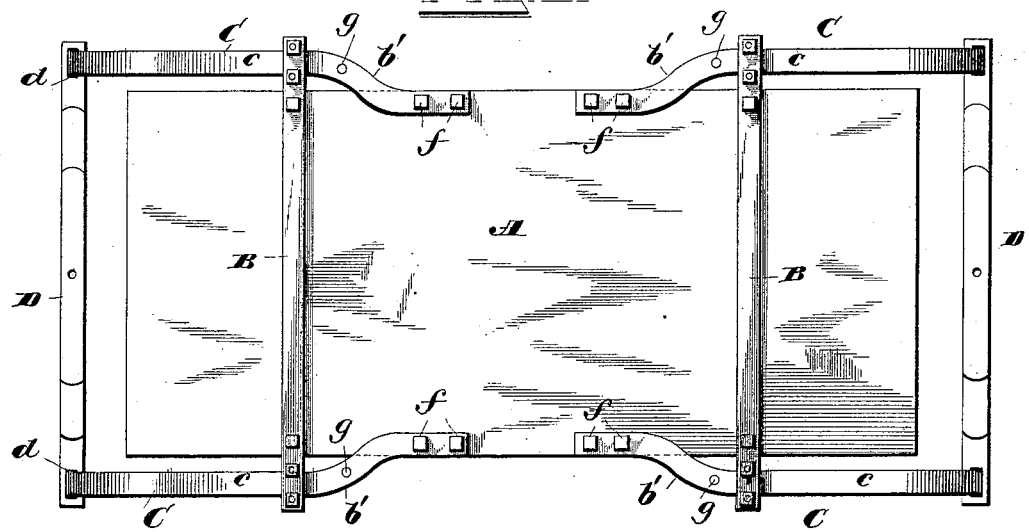
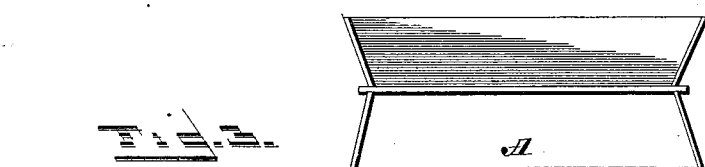
Milton R. Strunk.
INVENTOR
WITNESSES
G. S. Elliott.
E. M. Johnson.
by
Attorney

UNITED STATES PATENT OFFICE.

MILTON R. STRUNK, OF BOYERTOWN, PENNSYLVANIA.

VEHICLE-SPRING.

SPECIFICATION forming part of Letters Patent No. 390,625, dated October 2, 1888.

Application filed June 26, 1888. Serial No. 278,242. (No model.)

*To all whom it may concern:*

Be it known that I, MILTON R. STRUNK, a citizen of the United States of America, residing at Boyertown, in the county of Berks and State of Pennsylvania, have invented certain new and useful Improvements in Vehicles; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in springs for vehicles, the object of the same being to provide side springs which are so constructed that they will have dropped ends at the front and rear of the vehicle, the ends toward the vehicle being bent or turned inward under the body, so that said springs may be attached directly to the body, intermediately to cross-bars, and at their ends to the ends of transverse springs by connections which will permit the outer ends of the side springs to rock upon said connections; and my invention consists in the special construction and combination of the parts, as will be hereinafter fully set forth, and specifically pointed out in the claim.

My invention is designed as an improvement on Patent No. 256,269, dated April 11, 1882.

In the accompanying drawings, Figure 1 is a side view showing my improvement applied to the body of a vehicle. Fig. 2 is a bottom view. Fig. 3 is a rear elevation.

A refers to the body of a vehicle, which has rigidly bolted thereto body-bars B B, which extend beyond the edges of the body and are provided with clips $b$, which are adapted to encircle the side springs, C. The lower leaves, $c$, of the side springs, C, are curved upwardly at their outer ends, said outer ends passing through slots $d$ in the ends of the transverse springs D and secured to upwardly-projecting ears $d'$ by bolts $e$. The leaves $c$ beyond the clips $b$ $b$ curve inwardly, as shown at $b'$, and then extend toward the center of the vehicle parallel with the outer portions of the leaves, and are secured directly to the body by bolts $f f$. The leaf $c'$, which lies immediately above the leaf $c$, has its end portions, which overlie the curved portions of the leaf $c$, bent slightly inwardly to correspond with the inward curve thereof, and the upper leaf, $c^2$, is practically straight throughout its entire length. The leaves $c$ $c'$ $c^2$, which constitute the spring C, are connected to each other by a rivet or bolt, $g$, and the distance between the bar B and the point to which the leaf $c$ is attached to the body is such as to form practically a rigid connection between the body and end of the cross-bars, the outer ends of the leaves having sufficient spring movement.

The front and rear springs D are practically of ordinary construction, with the exception of the upper leaf, the ends thereof having upwardly-projecting ears, (hereinbefore referred to,) the leaf between these ears being slotted, so that the upwardly-turned end of the spring C can pass therethrough. These slots $d$ are of such a size that the curled or turned end of the leaf $c$ can be passed through said slots, and when the springs are connected to each other the side springs, C, can have a slight rocking movement upon the transverse springs without throwing them out of line or increasing the distance between the front and rear axle.

A side spring constructed as hereinbefore described has all the advantages of a side-bar vehicle.

Having described my invention, what I claim as new, and desire to secure by Letters Patent, is—

In combination with the springs D, provided at their outer ends with upwardly-projecting ears and slots, the side springs, C, having their outer ends secured to said ears, the front portions of said springs being curved, while the rear portions are curved inwardly and attached to the body, and cross-bars B, clipped to the said springs, substantially as shown, and for the purpose set forth.

In testimony whereof I affix my signature in presence of two witnesses.

MILTON R. STRUNK.

Witnesses:
MILTON H. DERR,
J. F. D. GEIGER.